United States Patent

McNeil, Sr. et al.

[15] 3,646,975

[45] Mar. 7, 1972

[54] TREE SHEARING APPARATUS

[72] Inventors: Donald J. McNeil, Sr., Portland; Richard R. Deline, West Linn, both of Oreg.

[73] Assignee: Esco Corporation, Portland, Oreg.

[22] Filed: Aug. 22, 1969

[21] Appl. No.: 852,423

[52] U.S. Cl. .................................144/34 E, 144/309 AC
[51] Int. Cl. .........................................A01g 23/02
[58] Field of Search...........144/2 Z, 3 D, 34 A, 34 E, 309 AC

[56] References Cited

UNITED STATES PATENTS

| | | | |
|---|---|---|---|
| 2,845,101 | 7/1958 | Hoadley | 144/34 E |
| 2,876,816 | 3/1959 | Busch et al. | 144/34 E |
| 3,143,813 | 8/1964 | Wells | 144/34 |
| 3,183,953 | 5/1965 | MacMillan et al. | 144/34 E |
| 3,364,964 | 1/1968 | Lacey | 144/34 E |
| 3,382,899 | 5/1968 | White | 144/34 E |
| 3,327,745 | 6/1967 | Meece et al. | 144/34 E |
| 3,421,558 | 1/1969 | Thompson | 144/34 E |

FOREIGN PATENTS OR APPLICATIONS

| | | | |
|---|---|---|---|
| 24,652 | 10/1950 | Finland | 144/34 R |

*Primary Examiner*—Gerald A. Dost
*Attorney*—Dawson, Tilton, Fallon & Lungmus

[57] ABSTRACT

An apparatus for shearing trees which is relatively compact and lightweight and which may be easily attached to a blade of a tractor, a log skidder, a boom, or other device. The apparatus includes a generally L-shaped body with a relatively thin, platelike blade slidably mounted thereon. Hydraulic pistons are mounted within the body for pushing the cutting edge of the blade toward the base of the L-shaped body, and a stationary anvil knife is attached to the base. The blade is shaped to cut the tree fibers closest to the operator first to assist in directional fall, and the upper surface of the blade may carry wedges for further assisting directional felling. The outer periphery the blade the blade is provided with an upstanding rim for pulling hung-up trees after they are severed. The apparatus may be pivotally secured to a vehicle, and the rear side of the body is provided with an arcuate blade member for log-decking or blading operations when the apparatus is pivoted into a raised position.

16 Claims, 15 Drawing Figures

PATENTED MAR 7 1972

INVENTORS:
DONALD J. McNEIL, SR.
RICHARD R. DELINE

BY: Dawson, Tilton, Falloy & Lungmus
ATT'YS

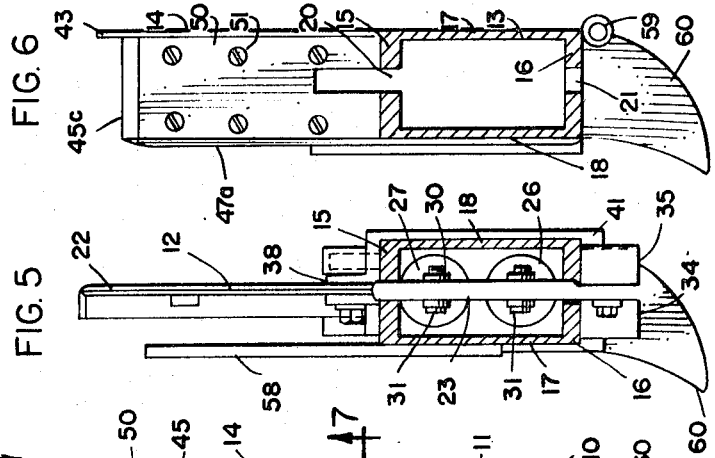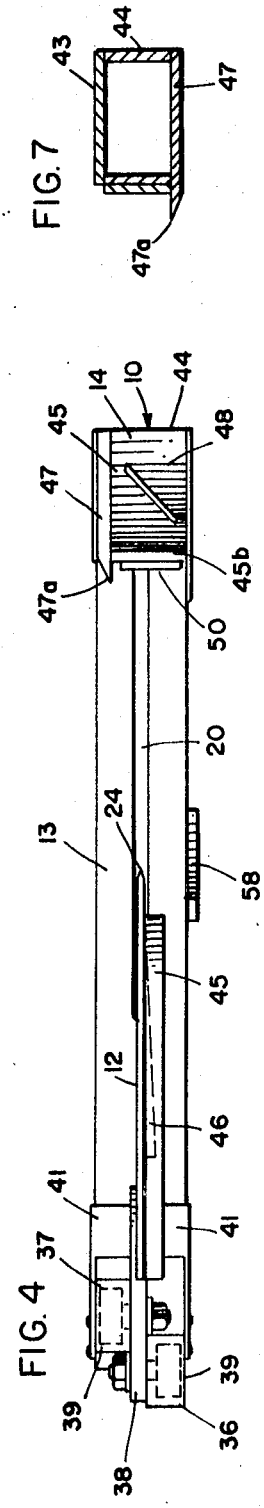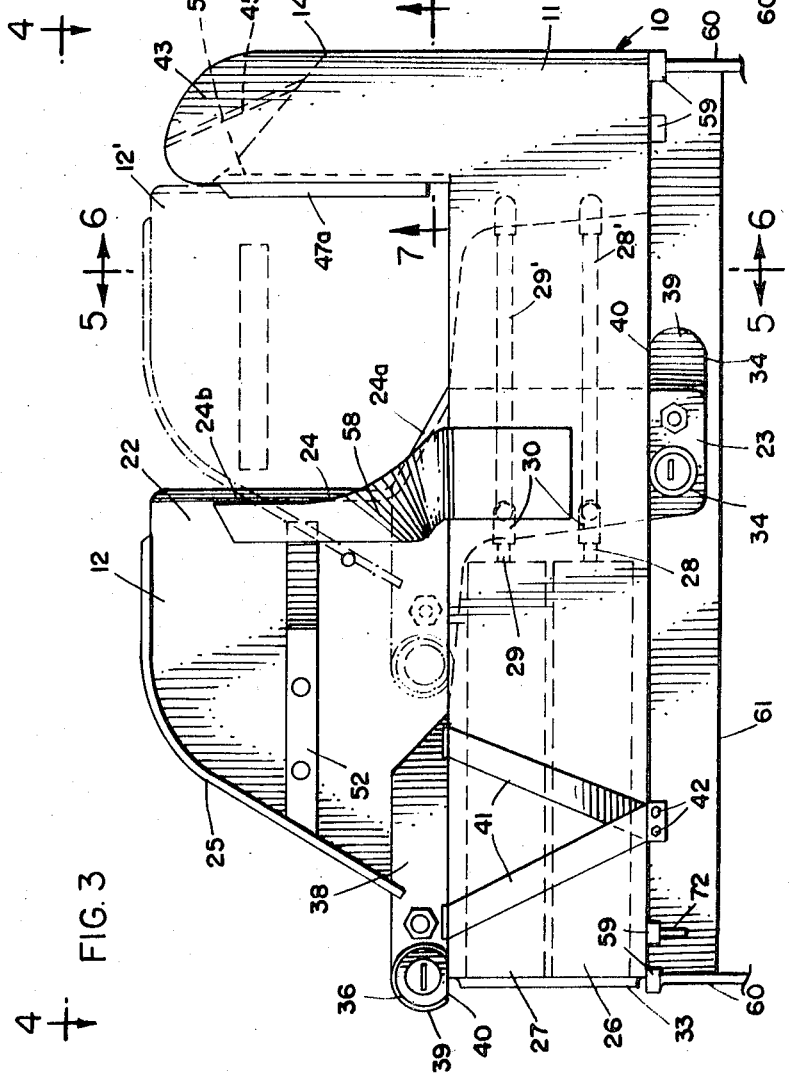

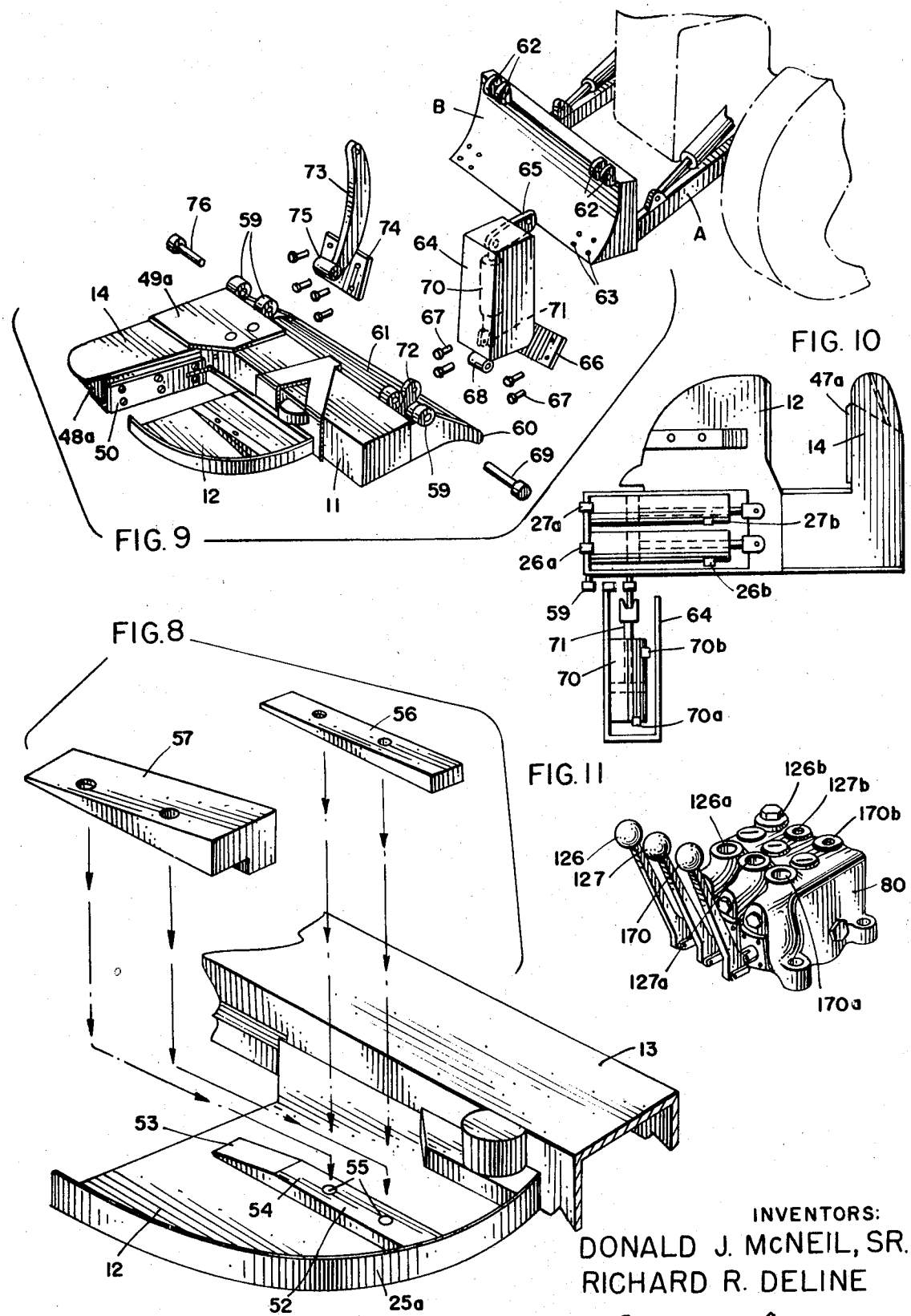

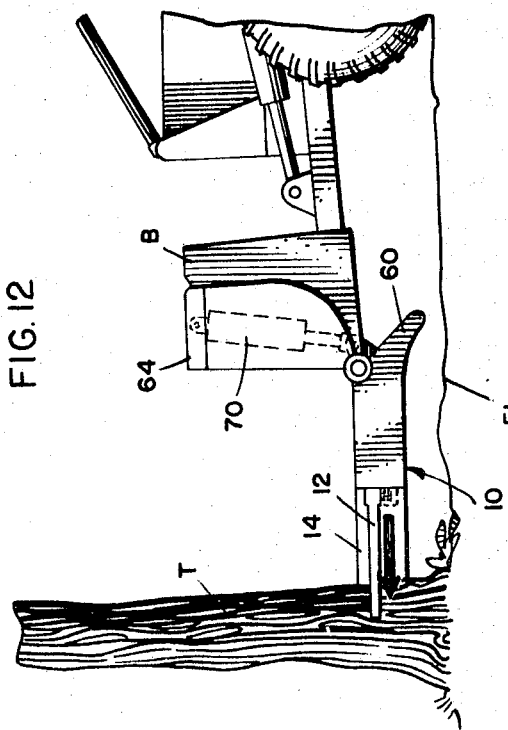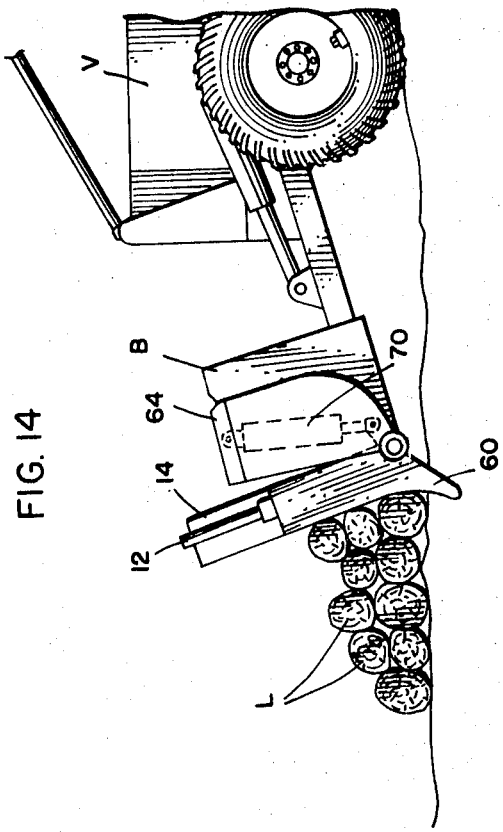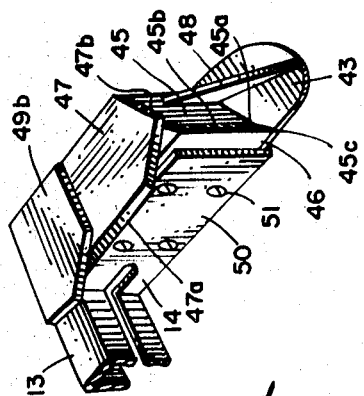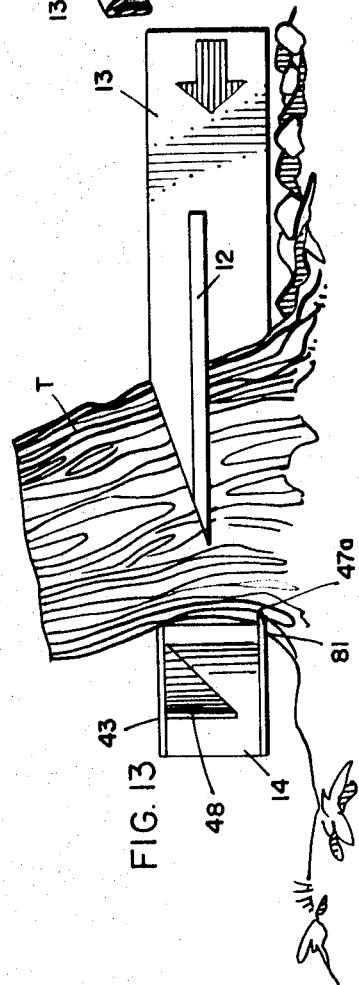

TREE SHEARING APPARATUS

BACKGROUND

In recent years vehicle-carried tree cutting devices have become increasingly popular in the logging industry. Vehicle-carried cutting devices generally provide greater mobility than manually operated chain saws and the like and also provide quicker cutting operation.

However, although several types of vehicle-carried cutting devices are now available, these devices have experienced a number of difficulties. For example, many devices are cumbersome and heavy and are required to be carried by a special vehicle. Other devices are somewhat more compact and may be removably attached to a vehicle, but attaching and removing these devices has proved to be time consuming. Further, while the device is attached to the vehicle, the maneuverability and versatility of the vehicle is sharply reduced, and the vehicle may not readily be used for other logging operations.

Most of the prior devices have one or more movable cutting blades which are pivoted toward each other to provide a snipping or scissors action. This sometimes results in a "kickback action" to the vehicle, and may also result in fiber damage, "barber chair" or tree splitting, and other undesirable effects.

Since hydraulically powered tool cutters may shear a tree in a matter of seconds, it is important that the direction of all of the tree be controlled since the operator would not have time to avoid a misdirected tree. Devices which do not provide sufficient directional felling may be extremely hazardous.

The foregoing and other problems have been solved by applicants' apparatus. The apparatus is relatively compact and lightweight, and may be readily attached to a tractor or other conventional logging vehicle. If it is desired to reach trees in a confined location, the apparatus may be mounted on a boom or the like. The apparatus may be pivotally attached and may be swung upwardly when not in use to increase the maneuverability of the vehicle and to permit the vehicle to be used for other operations. Further, when the apparatus is in a raised position, an arcuate blade is exposed which permits the vehicle to carry out normal blading operations such as log-decking and the like even while the apparatus is attached to the vehicle. The single movable blade is powered in a straight line by a pair of hydraulic cylinders to provide a smooth even cut with a minimum of fiber damage. Hydraulic circuitry adapts the cylinders for high speed opening and closing of the blade. A stationary anvil knife locks the anvil to the tree base to prevent upsliding, provides an undercut to aid in directional felling, and supports the blade after the cut is completed. Directional felling is further facilitated by the use of various sized wedges which may be removably attached to the blade. If a severed tree is hung-up on adjacent trees and does not fall, an upstanding rim around the periphery of the blade may be used to pull the severed tree.

DESCRIPTION OF THE DRAWING

The invention is explained in conjunction with an illustrative embodiment shown in the accompanying drawing, in which

FIG. 3 is a top plan view of the tree-shearing apparatus;

FIG. 4 is a view taken along the line 4—4 of FIG. 3;

FIG. 5 is a sectional view taken along the line 5—5 of FIG. 3;

FIG. 6 is a sectional view taken along the line 6—6 of FIG. 3;

FIG. 7 is a sectional view taken along the line 7—7 of FIG. 4;

FIG. 8 is a fragmentary perspective view showing the various sized wedges which may be used;

FIG. 9 is an exploded perspective view showing the attachment of the apparatus to a tractor blade;

FIG. 10 is a top plan view, partially schematic, of the hydraulic system for operating the shear blade and raising and lowering the apparatus;

FIG. 11 is a perspective view of the hydraulic valve control bank;

FIG. 12 is a fragmentary side elevational view showing the apparatus being positioned at the base of a tree;

FIG. 13 is a front view of the apparatus showing a tree being cut;

FIG. 14 is a fragmentary side elevational view showing the apparatus in a raised position and being used in a log-decking operation; and FIG. 15 is an enlarged fragmentary perspective view showing the bottom of the anvil.

DESCRIPTION OF SPECIFIC EMBODIMENT

Figure 1:
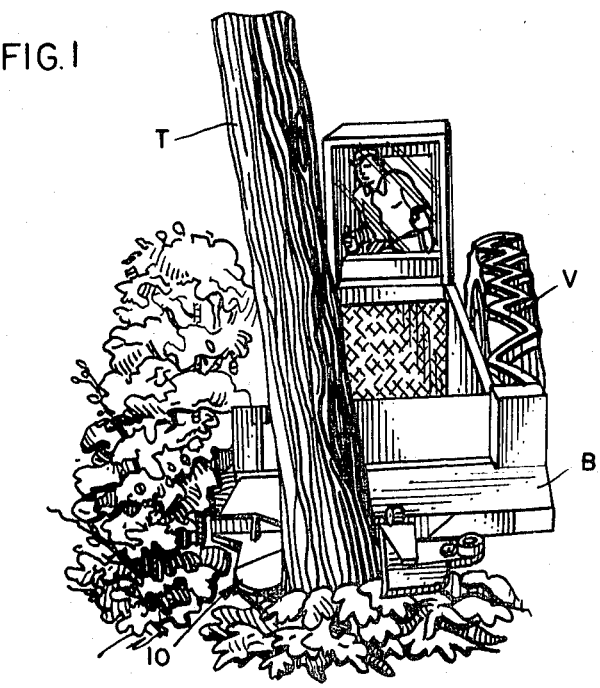
FIG. 1 is a perspective view of a vehicle equipped with the inventive tree-shearing apparatus and showing a tree being cut.

Referring to FIG. 1, the tree-shearing apparatus 10 which is carried by a vehicle V is shown in the process of cutting the base of a tree T. The particular vehicle illustrated is a logging tactor and includes a tractor blade B to which the tree-shearing apparatus 10 is pivotally and removably attached.

Referring to FIGS. 2–6, the apparatus 10 includes a generally L-shaped body 11 and a blade 12. The body 11 includes an elongated arm portion 13 and a base portion or anvil portion 14 which extends at right angles from one end of the arm portion. As can be seen best in FIGS. 5 and 6, the arm portion 13 is generally rectangular in transverse cross section and includes front and rear sides 15 and 16, respectively, and top and bottom sides 17 and 18, respectively. The front and rear sides 15 and 16 are provided with longitudinally extending slots 20 and 21, respectively, having a length equal to the stroke of the hydraulic cylinders, as will be discussed more fully hereinafter.

The blade 12 is generally planar and includes a relatively thin cutting portion 22 which extends forwardly from the front side 15 of the arm and a thicker attaching arm portion 23 which is slidably received by the slots 20 and 21 in the body 11. The cutting portion 22 of the blade is generally rectangularly shaped and is provided with a sharpened leading or cutting edge 24 facing the anvil 14 and a somewhat arcuately shaped trailing edge 25. The cutting edge 24 is shaped to include an angled portion 24a which extends angularly from the arm portion 13 away from the anvil 14 and a major portion 24b which extends generally perpendicularly with respect to the arm 13.

A pair of hydraulic cylinders 26 and 27 are mounted within the arm 13 and are equipped with piston rods or arms 28 and 29, respectively. Each piston is equipped with a bifurcated end fitting 30 which receives the attaching arm 23 of the blade, and the pistons 28 and 29 are secured to the blade by pins 31 which are inserted in openings provided through the end fittings 30 and attaching arm 23. The pins 31 may be retained in position by cotter pins or the like. The piston rods 28 and 29 are extendible toward the anvil as indicated in phantom at 28' and 29' in FIG. 3 under the influence of hydraulic pressure. The pistons are secured to the attaching arm 23 of the blade approximately in line with the major portion 24b of the blade cutting edge, and the spaced apart connections of the pistons to the blade provide a straight cutting action. Access to the hydraulic cylinders is provided by removable end plates 33 bolted to each end of the are 13.

Referring to FIGS. 3–5, a pair of slide followers 34 and 35 are bolted to the end of the attaching arm 23 of the blade, and a pair of slide followers 36 and 37 are bolted to an enthickened portion 38 of the blade which extends adjacent the front side 15 of the body 11. The individual slide followers of each pair are inverted with respect to each other, and each follower includes a cylindrical head 39 which is provided with a flat 40 for engaging a side of the body 11.

The slide followers restrain any tendency of the blade to rotate during cutting, and further stability to the blade is provided by straps 41 which extend from the enthickened portion 38 of the blade around the upper and lower sides 17 and 18 of the arm 13. The rear edges of the straps are bolted together by bolts 42, and the straps slide along the upper and lower sides of the arm as the blade moves under the influence of the hydraulic pistons.

Referring to FIGS. 2–7 and FIG. 15, the anvil 14 includes a top guide plate 43 which extends forwardly generally perpendicularly from the top side 17 of the arm portion of the apparatus and terminates in a rounded end portion. A sidewall 44 terminates rearwardly of the front of the top plate and a front wall 45 extends inwardly and forwardly from the sidewall 44. A second sidewall 46 opposite sidewall 44 and a bottom wall 47 anvil provide a generally rectangular cross-sectional configuration to the anvil. The forward end of the guide plate 43 may be reinforced and supported by brace 48, and top and bottom reinforcing plates 49a and 49b extend from the tops and bottoms of the anvil 14 and arm 13 and are secured thereto.

An anvil adjustment plate 50 is secured to the sidewall 46 of the anvil by bolts 51, and the plate may be moved toward or away from the blade 12 by adjusting the bolts so that the cutting edge 24b of the blade is flush with the plate 50 when the hydraulic cylinders 26 and 27 are at full stroke. The blade may thereby make a full cut without having the cutting edge dulled.

The bottom wall 47 of the anvil extends inwardly beyond the anvil adjustment plate 50 and is sharpened to provide an anvil knife 47a. The anvil knife is positioned below the plane of the blade 12 and aids in providing a directional fall to the tree by duplicating the conventional tree undercut in standard chain saw falling practices. The anvil knife also serves to hold the anvil head in a stationary position by "biting" into the tree. Without this knife, the anvil tends to slide up the curved base of the tree as the tree is being sheared, and hence the blade would be forced into a curved path, putting undue strain on the blade.

As can be seen best in FIG. 15, the forward edge of the bottom wall 47 is also sharpened as at 47b, and the front wall 45 angles forwardly at 45a to provide a root-trimming blade 45b with a sharpened forward edge 45c.

The trailing edge 25 of the blade is equipped with an upstanding rim 25a and a wedge 52 is attached to the upper surface of the blade. The upper surface of the wedge 52 is provided with an inclined portion 53 and a horizontal portion 54 which is provided with a pair of drilled and tapped holes 55. The wedge 52 aids in providing directional falling, and is generally satisfactory for falling of relatively large diameter trees. If medium-sized trees are being sheared, wedge 56 (FIG. 8) which is inclined slightly more that the inclined face 53 of the wedge 52 can be mounted on the wedge 52 and secured thereto by means of bolts which are received in the openings 55. If smaller trees are being sheared, wedge 57, which is wider and more inclined than either wedge 52 or wedge 56, can be secured to wedge 52.

A tree ejector arm 58 is secured to the upper side 18 of the body and extends forwardly therefrom for a majority of the length of the cutting edge 24. The tree ejector arm prevents the sheared tree from riding back with the blade when the blade returns to its original position.

Figure 2:
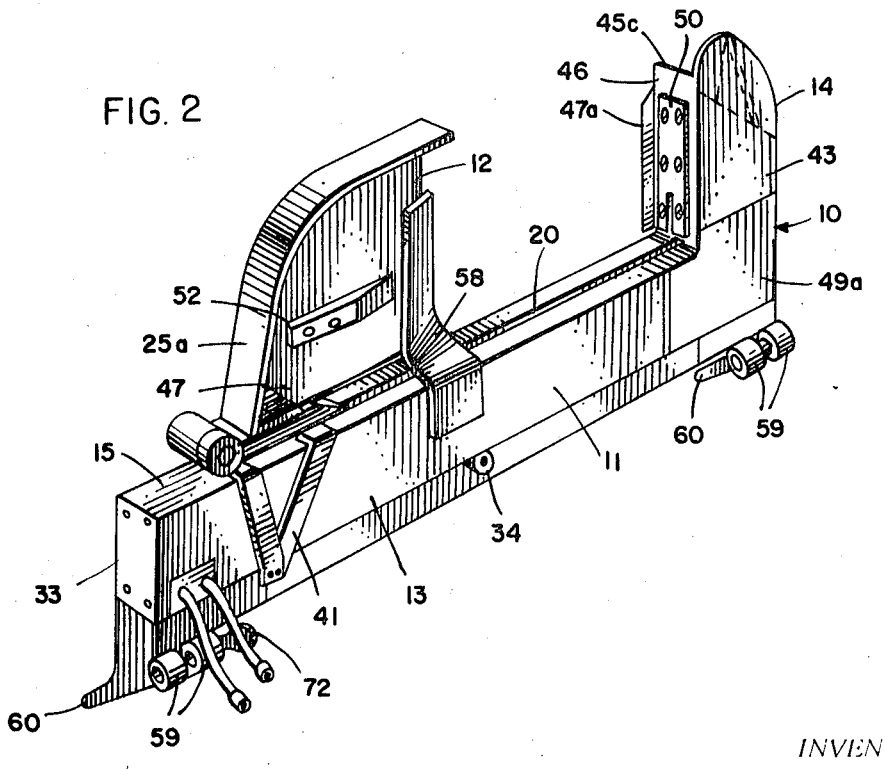
FIG. 2 is a perspective view of the tree-shearing apparatus.

Referring to FIGS. 2 and 3, each end of the arm 13 is provided with a pair of spaced apart sleeves 59 for attaching the tree-shearing apparatus to the carrying vehicle, and a generally hook-shaped plate 60 extends outwardly from the rear side 16 of the arm 13 adjacent each end thereof. If desired, a curved or arcuate plate 61 may extend between the hooked plates 60 and secured thereto.

The means for attaching the apparatus to a tractor, boom, or other vehicle, can best be seen in FIG. 9. The upper edge of the tractor blade B is provided with a pair of spaced apart sleeves 62 adjacent each side of the blade, and the lower portion of the blade is provided with threaded bolt openings 63. A generally boxlike cylinder housing 64 is provided at the upper end thereof with an attaching arm 65 adapted to be received between the sleeves 62 on one end of the tractor blade, and the lower portion of the housing 64 includes an attaching plate 66 adapted to be bolted to the tractor blade by means of bolts 67 which are received by boltholes 63 in the blade. The front of the housing 64 includes an attaching sleeve 68 which is adapted to be received between a pair of attaching sleeves 59 on the shear and rotatably retained therebetween by pin 69. The housing 64 carries a hydraulic cylinder 70 and piston rod 71, the lower end of which is bifurcated for connection to the pivot arm 72 which extends rearwardly from the arm portion 13 of the tree-shearing apparatus. The other end of the tree-shearing apparatus is connected to the tractor blade by means of a support arm 73, the upper end of which is received between a pair of sleeves 62 on the tractor blade and the lower end of which carries attaching plate 74 which is boltably secured to the tractor blade. The lower end of support arm 73 also includes attaching sleeve 75 which is received between the pair of sleeves 59 on the tree-shear and rotatably retained therein by pin 76. The apparatus may also be welded directly to blade B, eliminating the need for bolts, etc.

The hydraulic system for raising and lowering the tree-shear and operating the shearing blade will be described with reference to FIGS. 9–11. Each of the cylinders 26 and 27 carried by the tree-shear 10 is double acting and includes a pair of hydraulic ports, cylinder 26 being provided with ports 26a and 26b and cylinder 27 being provided with ports 27a and 27b. Similarly, cylinder 70 carried by the cylinder housing 64 is provided with hydraulic ports 70a and 70b. Valve control bank 80 is carried by the vehicle adjacent the operator and includes valve levers 126, 127, and 170 for operating the cylinders 26, 27, and 70, respectively. Each of the valve levers controls a pair of valve ports in the valve control bank 80, and the levers are illustrated in FIG. 11 in their neutral position. Valve lever 126 is associated with valve port 126a which is connected by a suitable hydraulic hose (shown partially in FIG. 2) to port 26a in the cylinder 26, and valve port 126b is plugged, cylinder port 26b being vented to the air. Valve lever 127 is associated with valve port 127a connected to cylinder port 27a and valve port 127b connected to cylinder port 27b. Finally, valve lever 170 is associated with valve port 170a and which is connected to cylinder port 70a and valve port 170b which is connected to cylinder port 70b.

OPERATION

The blade 12 is normally in the position illustrated in solid in FIG. 3, and the tree-shearing apparatus is advanced toward the tree which is to be cut so that the tree is received between the cutting edge of the blade and the anvil 14. Referring to FIG. 12 the cutting blade 12 may be maintained in a horizontal position as the apparatus is advanced toward the tree so that the tree may be sheared adjacent the ground, thereby minimizing the resultant stump. As the apparatus is advanced, the sharpened forward edges 45c and 47b of the root trimming blade 45b and the bottom wall 47, respectively, remove a portion of the root swell as indicated at 81 in FIG. 13, and the removal of this portion of the swell helps prevent the upsliding of the anvil on the tree that has commonly heretofore been encountered. The anvil knife 47a also bites into the tree and also helps prevent upsliding. Upsliding of the shearing mechanism which has heretofore been a problem not only puts undue stress on the shearing blade but an objectionable high stump or "barber-chair" is frequently left on the anvil side of the tree.

After the tree-shear apparatus is positioned about the base of the tree, valve lever 127 is operated to introduce hydraulic fluid into port 27a of the cylinder 27 to cause the piston rod 29 to force the blade 12 toward the anvil 14. The thin blade 12 minimizes compression damage to the tree fibers, and the angled portion 24a of the blade cutting edge cuts the tree fibers closest to the operator first, thereby causing the sheared tree to fall slightly away from the vehicle in a direction opposite to the direction of blade travel. The pressure of the hydraulic fluid and the size of the cylinder 27 is such that the blade 12 is rapidly powered through the tree. As the blade is forced through the tree, the anvil knife 47a notches the tree to provide the desired undercut for directional falling. The wedge 52 (or either of the auxiliary wedges 56 and 57 depending upon the tree size) also aids in providing a directional fall, and the guillotine action of the blade, which travels in a straight line, provides a smooth, even cut and eliminates "kick-back" to the vehicle.

After the blade has passed through the tree, the valve lever 127 is moved to close valve port 127a and open valve port 127b, thereby introducing hydraulic fluid through cylinder port 27b and causing the blade to return to its original position. The tree ejector arm 58 prevents the tree from riding back on the blade as the blade returns. If a tree is "hung-up" after it is sheared, that is, if its branches engage the branches of adjacent trees so that the tree will not fall, the blade can be maintained in its closed position illustrated at 12' in FIG. 3 while the vehicle is reversed. The upstanding rim 25a around the trailing edge of the blade will then pull the sheared tree down. The undercut knife 47a serves to support the blade 12 during this pulling operation.

If the tree being sheared is relatively thick and the blade 12 stalls before the tree is completely sheared, the valve lever 126 is moved to open valve port 126a to introduce hydraulic fluid into cylinder 26. The added cutting force provided by cylinder 26b will then power the blade through the thicker portion of the tree only. Cylinder 27 only will then complete the cut. Cylinder 26 is single acting, cylinder port 26 being vented to air, and after the cut is made, only cylinder 27 is used to return the blade to its original position.

The cylinder 70 connected to the rear end of the shearing apparatus enables the operator to have complete hydraulic control over the angular position of the shear. If it is desirable to shear the tree at an angle from the horizontal, valve lever 170 is moved to introduce hydraulic fluid through cylinder port 70a to force piston 71 downwardly. The piston 71 acts on the connecting arm 72 to pivot the blade 12 upwardly about the attaching lugs 59 until the desired angle of inclination is achieved. When the tree-shearing apparatus is not being used, or when the vehicle is traveling from one location to another, the apparatus may be pivoted upwardly about its pivotal attachment to the tractor blade as illustrated in FIG. 14 by allowing the piston 71 to complete its full downward stroke. When the apparatus is in the raised position, the curved plate 61 which extends between the curved end plate 60 assumes an approximately vertical position and approximates the shape of the conventional tractor blade. The tractor may then be used for log-decking operations as shown in FIG. 14 with logs L or for other blading operations even while the apparatus is attached to the vehicle. When the tractor approaches a tree which is to be sheared, the valve lever 170 is moved to introduce hydraulic fluid into cylinder port 70b to pivot the blade downwardly into the desired position.

Although we have described the tree-shearing apparatus as being attached to a conventional tractor blade, the blade can be removed and the apparatus can be attached directly to the tractor blade arms A to reduce the overall weight of the assembly. Further, the apparatus can be attached to other types of vehicles or can be attached to a logging boom.

While in the foregoing specification, a detailed description of a specific embodiment of our invention has been set forth for the purpose of illustration, it is to be understood that many of the details hereingiven may be varied considerably by those skilled in the art without departing from the spirit and scope of the invention.

What is claimed is:

1. An apparatus for shearing trees comprising a generally L-shaped body having an elongated arm portion providing a rear for the body and a base portion extending forwardly from the arm portion, a generally planar blade slidably mounted on said arm portion and extending forwardly therefrom, said blade being slidable longitudinally along the arm portion toward the base portion, hydraulic piston means carried by said body for slidably moving said blade, means on said body for pivotally attaching the body to a support member, said attaching means adapting said body to be movable between a lowered position in which said blade is generally horizontal and a raised position in which said blade is inclined upwardly from the horizontal, and plate means on said body extending generally rearwardly therefrom whereby said plate means extends generally vertically when the body is in the raised position.

2. The apparatus of claim 1 in which said plate means includes an elongated generally arcuately shaped plate, said plate curving rearwardly and downwardly when the body is in the lowered position.

3. The apparatus of claim 1 wherein said blade is generally planar and has an upper surface and a lower surface, said blade including wedge means secured to the upper surface thereof for providing directional fall to a tree being sheared by the blade.

4. The apparatus of claim 1 wherein said blade is generally planar, a portion of the periphery of the blade adjacent the base portion providing a cutting edge, the cutting edge having an inner portion extending angularly away from the base portion and an outer portion extending generally parallel to the base portion.

5. The apparatus of claim 1 in which said hydraulic piston means includes a pair of hydraulic cylinders, a piston received by each cylinder and attached to the blade, and valve means for selectively introducing hydraulic pressure into one or both of the hydraulic cylinders.

6. The apparatus of claim 1 in which said attaching means includes a hydraulic cylinder adapted to be mounted on the support member and a hydraulic piston received by said hydraulic cylinder and attached to said body.

7. The apparatus of claim 1 in which the base portion is generally rectangular in cross section and includes top, bottom, and opposite sidewalls, an elongated anvil plate on one of the sidewalls extending generally perpendicularly to the plane of the blade, said anvil plate being adjustably secured to the sidewall for movement toward and away from the blade, said arm portion providing an elongated knife extending beyond said anvil plate toward said blade below the plane of the blade.

8. The apparatus of claim 7 including a root-trimming blade carried by the forward end of the arm portion whereby a portion of a tree to be sheared is cut away as the apparatus is positioned about the tree.

9. An apparatus for shearing trees comprising an elongated arm, a stop member on said arm extending generally transversely therefrom, a blade slidably mounted on said arm and extending generally transversely therefrom, said blade being slidable generally longitudinally along the arm toward the stop member, and means carried by said arm for slidably moving said blade, the portion of the blade adjacent the arm extending away from the stop member as it extends outwardly from the arm whereby the blade is adapted to cut closest to the arm first as the blade is moved toward the stop member.

10. An apparatus for shearing trees comprising an elongated arm, a stop member on said arm extending generally transversely therefrom, a blade slidably mounted on said arm and extending generally transversely therefrom, said blade being slidable generally longitudinally along the arm toward the stop member, means carried by said arm for slidably moving said blade, and a generally arcuately shaped plate extending from the arm in a direction generally opposite to the direction in which the blade extends from the body.

11. An apparatus for shearing trees comprising a generally L-shaped body having an elongated arm portion providing a rear for the body and a base portion extending forwardly from the arm portion, a generally planar blade slidably mounted on the arm portion and extending forwardly therefrom, said blade being slidable longitudinally along the arm portion toward the base portion, and a pair of spaced apart generally hook-shaped plates extending generally rearwardly from the arm portion, each plate extending in a plane generally perpendicular to the plane of the blade and having a generally arcuate edge extending rearwardly and downwardly from the arm portion.

12. An apparatus for shearing trees comprising a generally L-shaped body having an elongated arm portion providing a rear for the body and a base portion extending forwardly from the arm portion, a generally planar blade slidably mounted on said arm portion and extending forwardly therefrom, said blade being slidable longitudinally along the arm portion toward the base portion, the blade including an attaching portion extending into the arm portion, a pair of extensible hydraulic motors extending generally longitudinally within the arm portion, one end of each of the hydraulic motors being secured to the attaching portion whereby extension of the hydraulic motors moves the blade toward the base portion.

13. The apparatus of claim 12 including valve means for selectively introducing hydraulic pressure into one or both of the hydraulic motors for selectively extending one or both of the motors by hydraulic pressure.

14. The apparatus of claim 12 in which a portion of the periphery of the blade provides a cutting edge and a portion of the remainder of the blade periphery is provided with an upstanding rim whereby a tree may be sheared by said blade and pulled by said rim.

15. The apparatus of claim 12 in which the arm portion includes an outer wall surrounding the hydraulic motors, a portion of the outer wall surrounding the hydraulic being provided with an elongated slot extending in the direction in which the hydraulic motors are extensible, the attaching portion of the blade extending into the arm portion through the slot in the outer wall thereof.

16. An apparatus for shearing trees comprising a generally L-shaped body having an elongated arm portion providing a rear for the body and a base portion extending forwardly from the arm portion, a generally planar blade slidably mounted on said arm portion and extending forwardly therefrom , said blade being slidable longitudinally along the arm portion toward the base portion, the blade including an attaching portion extending into the arm portion, a pair of extensible hydraulic motors extending generally longitudinally within the arm portion, one end of each of the hydraulic motors being secured to the attaching portion whereby extension of the hydraulic motors moves the blade toward the base portion, the base portion including a forwardly extending sidewall extending generally perpendicularly to the blade, the forward end of the sidewall being provided with a sharpened root-trimming edge whereby a portion of the tree to be sheared may be cut away as the apparatus is advanced toward the tree.

* * * * *

PO-1050
(5/69)

UNITED STATES PATENT OFFICE
CERTIFICATE OF CORRECTION

Patent No. 3,646,975      Dated March 7, 1972

Inventor(s) Donald J. McNeil, Sr. and Richard R. Deline

It is certified that error appears in the above-identified patent and that said Letters Patent are hereby corrected as shown below:

In column 8, line 2, please delete "surrounding the hydraulic".

Signed and sealed this 30th day of May 1972.

(SEAL)
Attest:

EDWARD M. FLETCHER, JR.
Attesting Officer

ROBERT GOTTSCHALK
Commissioner of Patents